(12) United States Patent
Huang

(10) Patent No.: US 10,854,162 B2
(45) Date of Patent: Dec. 1, 2020

(54) GAMMA VOLTAGE REGULATION CIRCUIT, AND DISPLAY DEVICE

(71) Applicants: Chongqing HKC Optoelectronics Technology Co., Ltd., Chongqing (CN); HKC Corporation Limited, Shenzhen (CN)

(72) Inventor: Xiaoyu Huang, Chongqing (CN)

(73) Assignees: Chongqing HKC Optoelectronics Technology Co., Ltd., Chongqing (CN); HKC Corporation Limited, Shenzhen (CN)

(*) Notice: Subject to any disclaimer, the term of this patent is extended or adjusted under 35 U.S.C. 154(b) by 8 days.

(21) Appl. No.: 16/245,272

(22) Filed: Jan. 11, 2019

(65) Prior Publication Data

US 2020/0105218 A1 Apr. 2, 2020

Related U.S. Application Data

(63) Continuation of application No. PCT/CN2018/119169, filed on Dec. 4, 2018.

(30) Foreign Application Priority Data

Sep. 30, 2018 (CN) .......................... 2018 1 1165394

(51) Int. Cl.
 *G09G 3/36* (2006.01)
 *G02F 1/1345* (2006.01)

(52) U.S. Cl.
 CPC ....... *G09G 3/3696* (2013.01); *G02F 1/13454* (2013.01); *G09G 3/3614* (2013.01); *G09G 3/3688* (2013.01)

(58) Field of Classification Search
 CPC .................................................... G09G 3/3696
 USPC ............................................................ 345/89
 See application file for complete search history.

(56) References Cited

U.S. PATENT DOCUMENTS

| | | | |
|---|---|---|---|
| 2006/0132406 A1* | 6/2006 | Pan ...................... | G09G 3/2011 345/89 |
| 2008/0043044 A1* | 2/2008 | Woo ..................... | G09G 3/3696 345/690 |
| 2015/0187264 A1 | 7/2015 | Pyo | |

FOREIGN PATENT DOCUMENTS

| | | |
|---|---|---|
| CN | 102411914 A | 4/2012 |
| CN | 105609064 A | 5/2016 |
| CN | 105957489 A | 9/2016 |
| CN | 106023928 A | 10/2016 |
| CN | 106157915 A | 11/2016 |

* cited by examiner

*Primary Examiner* — Long D Pham (57) ABSTRACT

The present application discloses a gamma voltage regulation circuit, and a display device. The circuit includes: a gamma voltage input port and a gamma voltage output port; a switching controlling circuit, configured to generate a first control signal or a second control signal according to a timing sequence control signal received; a gamma voltage output circuit, configured to switch on when receiving the first switching signal and to output a first gamma voltage input from the gamma voltage input port to the gamma voltage output port; a gamma voltage processing circuit, configured to convert the first gamma voltage input from the gamma voltage input port to a second gamma voltage when receiving the second control signal and then to output the second gamma voltage to the gamma voltage output port.

18 Claims, 5 Drawing Sheets

GAMMA VOLTAGE REGULATION CIRCUIT, AND DISPLAY DEVICE

RELEVANT APPLICATION

This application is a Continuation Application of PCT Application No. PCT/CN2018/119169 filed on Dec. 4, 2018, which claims the benefit of Chinese Patent Application No. 201811165394.0, filed with the Chinese Patent Office on Sep. 30, 2018 and entitled "gamma voltage regulation circuit, and display device", which is incorporated herein by reference in its entirety.

FIELD

The present application relates to the field of electronic circuit technology, and in particular, to a gamma voltage regulation circuit, and a display device.

BACKGROUND

With the development of display technology, display devices develop toward lower cost and higher image quality. For example, the cost can be reduced by increasing the number of gate drivers and decreasing the number of source driver circuits. However, it makes charging rate homogeneity in a display panel cannot be ensured, leading to image quality problems in the display panel, such as color deviation and so on.

SUMMARY

It is one main object of the present application to provide a gamma voltage regulation circuit, and a display device, aiming to improve the image quality of the display panel.

In order to realize the above aim, the present application provides a gamma voltage regulation circuit including:

a gamma voltage input port and a gamma voltage output port;

a switching controlling circuit, configured to generate a first control signal or a second control signal according to the timing sequence control signal received;

a gamma voltage output circuit, configured to switch on when receiving the first switching signal and to output a first gamma voltage input from the gamma voltage input port to the gamma voltage output port;

a gamma voltage processing circuit, configured to convert the first gamma voltage input from the gamma voltage input port to a second gamma voltage when receiving the second control signal, and then to output the second gamma voltage to the gamma voltage output port.

Optionally, the switching controlling circuit includes a trigger, a first switching tube, and a second switching tube, a clock signal input port of the trigger is configured to receive the timing sequence control signal, a signal output port of the trigger connects to a controlled port of the first switching tube and a controlled port of the second switching tube, an input port of the first switching tube connects to a first direct current power supply, an output port of the first switching tube is configured to output the first control signal, an output port of the second switching tube is configured to output the second control signal, an input port of the second switching tube is grounded, the output port of the first switching tube and the output port of the second switching tube further connect to a signal input port of the trigger.

Optionally, the switching controlling circuit further includes a pull down resistor, a first port of the pull down resistor connects to a common port of the first switching tube and the second switching tube, a second port of the pull down resistor is grounded.

Optionally, the gamma voltage output circuit includes a third switching tube, an input port of the third switching tube connects to the gamma voltage input port, an output port of the third switching tube connects to the gamma voltage output port, a controlled port of the third switching tube connects to an output port of the first switching tube and an output port of the second switching tube.

Optionally, the gamma voltage processing circuit includes a forth switching tube, a second resistor, and a third resistor, a controlled port of the forth switching tube connects to the output port of the first switching tube and the output port of the second switching tube, an input port of the forth switching tube connects to the gamma voltage input port, an output port of the forth switching tube connects to a first port of the second resistor, of the second resistor is grounded through the third resistor, a common port of the second resistor and the third resistor further connects to the gamma voltage output port.

Optionally, the gamma voltage processing circuit further includes a fifth switching tube, the fifth switching tube connects in series to the common port of the second resistor and the third resistor and the gamma voltage output port.

Optionally, the first control signal and the second control signal are square wave signals with opposite polarity.

Optionally, a duty ratio of the first control signal and a duty ratio of the second control signal are defined according to a clock control signal of a row scanning line.

Optionally, the first gamma voltage GmA is proportional to the second gamma voltage GmB, namely GmB=X*GmA; wherein X is a proportionality coefficient, and X is a positive number less than one.

Optionally, the primary gamma voltage regulation branch circuit includes:

a first gamma voltage output circuit, configured to switch on when receiving the first control signal and to output the first gamma voltage input from the gamma voltage input port to the gamma voltage output port;

a first gamma voltage processing circuit, configured to convert the first gamma voltage input from the gamma voltage input port to the second gamma voltage when receiving the second control signal and then to output the second gamma voltage.

Optionally, the first control signal and the second control signal are square wave signals with opposite polarity.

Optionally, the secondary gamma voltage regulation branch circuit includes:

a second gamma voltage output circuit, configured to switch on when receiving the third control signal and to output the second gamma voltage to the gamma voltage output port;

a second gamma voltage processing circuit, configured to convert the second gamma voltage to the third gamma voltage when receiving the forth control signal and then to output the third gamma voltage to the gamma voltage output port.

Optionally, the third control signal and the forth control signal are square wave signals with opposite polarity.

The present application further provides a gamma voltage regulation circuit, including:

a gamma voltage input port and a gamma voltage output port;

a switching controlling circuit, a controlled port of the switching controlling circuit connects to the timing sequence controller, the switching controlling circuit is configured to generate a corresponding control signal according to the timing sequence control signal received, the control signal includes a first control good, a second control signal, a third control signal, and a forth control signal;

a primary gamma voltage regulation branch circuit, configured to output a first gamma voltage input from the gamma voltage input port when receiving the first control signal, or to convert the first gamma voltage input from the gamma voltage input port to a second gamma voltage when receiving the second control signal and then to output the second gamma voltage;

a secondary gamma voltage regulation branch circuit, configured to output the second gamma voltage when receiving the third control signal, or to convert the second gamma voltage input from the gamma voltage input port to a third gamma voltage when receiving the forth control signal and then to output the third gamma voltage.

Optionally, the display device further includes a display panel, the display panel connects to the source driving circuit.

Optionally, the display panel integrates a thin film transistor array, and in the thin film transistor array, each column of thin film transistors connect to the source driving circuit through a data line.

Optionally, the display device further includes a gate driving circuit, and in the thin film transistor array, each row of thin film transistors connect to the gate driving circuit through a scanning line.

Optionally, a pixel driving framework in the display panel is three gate pixel driving framework.

The present application further provides a display device, including a gamma voltage generation circuit, a source driving circuit, a timing sequence controller, and a gamma voltage regulation circuit, the gamma voltage regulation circuit is connected in series between the gamma voltage generation circuit and the source driving circuit, a controlled port of the gamma voltage regulation circuit connects to a controlling port of the timing sequence controller; the gamma voltage regulation circuit includes:

a gamma voltage input port and a gamma voltage output port;

a switching controlling circuit, configured to generate a first control signal or a second control signal according to the timing sequence control signal received;

a gamma voltage output circuit, configured to switch on when receiving the first switching signal, to output a first gamma voltage input from the gamma voltage input port to the gamma voltage output port; and a gamma voltage processing circuit, configured to convert the first gamma voltage input from the gamma voltage input port to a second gamma voltage when receiving the second control signal, and then to output the second gamma voltage to the gamma voltage output port.

In the present application, the gamma voltage regulation circuit generates a first control signal/a second control signal according to a timing sequence control signal received through setting a switching controlling circuit, so as to make a gamma voltage output circuit to switch on when receiving the first switching signal and to output a first gamma voltage input from the gamma voltage input port to the gamma voltage output port; or to set a gamma voltage processing circuit to convert the first gamma voltage input from the gamma voltage input port to a second gamma voltage when receiving the second control signal and then to output the second gamma voltage to the gamma voltage output port. The present application adjusts a data voltage output to a corresponding sub pixel through adjusting a gamma voltage output to a source driving circuit in one same gray scale, to ensure homogeneity of charging rate in each sub pixel in a display panel, so as to solve the color deviation problem in the display panel caused by the inhomogeneity of charging rate in each sub pixel. The present application helps improve image quality of the display panel.

BRIEF DESCRIPTION OF THE DRAWINGS

To illustrate the technical solutions according to the embodiments of the present application or the prior art more clearly, the accompanying drawings for describing the embodiments or the prior art are introduced briefly in the following. Apparently, the accompanying drawings in the following description are only about some embodiments of the present application, and persons of ordinary skill in the art can derive other drawings from the accompanying drawings without creative efforts.

The realizing of the aim, functional characteristics, advantages of the present application are further described in detail with reference to the accompanying drawings and the embodiments.

DETAILED DESCRIPTION

The technical solutions of the embodiments of the present application will be clearly and completely described in the following with reference to the accompanying drawings. It is obvious that the embodiments to be described are only a part rather than all of the embodiments of the present application. All other embodiments obtained by persons skilled in the art based on the embodiments of the present application without creative efforts shall fall within the protection scope of the present application.

It is necessary to explain that, if there are directional instructions in the exemplary embodiments of the present application (such as top, down, left, right, front, back), the directional instructions can only be used for explaining relative position relations, moving condition of the members under a special form (referring to figures), and so on, if the special form changes, the directional instructions changes accordingly.

In addition, if there are descriptions such as the "first", the "second" in the present application, the descriptions can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present application.

The present application provides a gamma voltage regulation circuit, which is suitable for display devices such as televisions, computers, mobile phones and so on.

A display device generally includes a display panel, a gate driving circuit, a source driving circuit and a timing sequence controller, and the display panel integrates a thin film transistor array mostly. In the thin film transistor array, each row of thin film transistors generally connect to the gate driving circuit through a scanning line, and each column of thin film transistors connect to the source driving circuit through a data line. A gate driver controls the thin film transistors to switch on row by row when receiving a timing sequence control signal output by the timing sequence controller, so as to enable a source driver to output a data signal to a corresponding pixel and then to display an image to be displayed.

Figure 1:
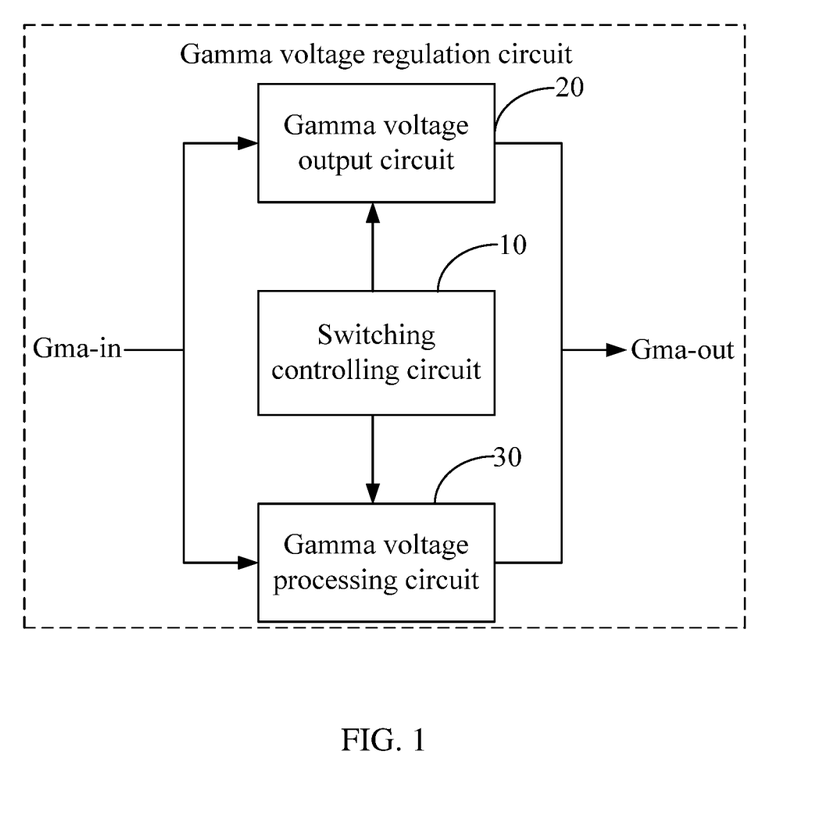
FIG. 1 is a functional module schematic diagram of a gamma voltage regulation circuit in an embodiment of the present application.
Figure 2:
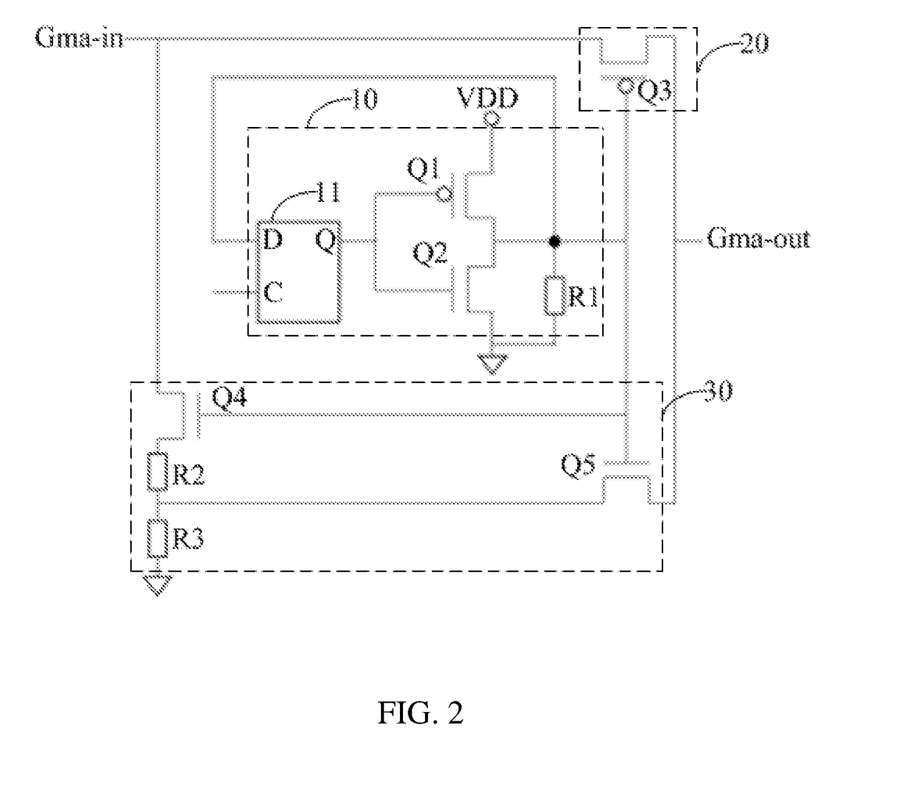
FIG. 2 is a circuit structure schematic diagram of a gamma voltage regulation circuit in an embodiment of the present application.

To solve the above problem, referring to FIG. 1 and FIG. 2, in an embodiment of the present application, the gamma voltage regulation circuit includes:

a gamma voltage input port Gma-in and a gamma voltage output port Gma-out;

a switching controlling circuit 10, configured to generate a first control signal or a second control signal according to the timing sequence control signal received;

a gamma voltage output circuit 20, configured to switch on when receiving the first switching signal, to output a first gamma voltage input from the gamma voltage input port Gma-in to the gamma voltage output port Gma-out;

a gamma voltage processing circuit 30, configured to convert the first gamma voltage input from the gamma voltage input port Gma-in to a second gamma voltage when receiving the second control signal and then to output the second gamma voltage to the gamma voltage output port Gma-out.

In the present embodiment, the gamma voltage input port Gma-in connects to an output port of a gamma voltage generation circuit in the display device, the gamma voltage output port Gma-out connects to the source driving circuit. Generally, the gamma voltage generation circuit generates multiple gamma reference voltages taking supply voltage input as a reference voltage, and then outputs the gamma reference voltages to the source driving circuit. The gamma voltage generation circuit can generate 14 or 18 gamma reference voltages generally. The source driving circuit generates a corresponding amount of gray scale voltages according to the reference voltages generated by the gamma voltage generation circuit and the number of gray scales in the display panel. For example, in an 8 bit display panel, the number of gray scales is 256, so the source driving circuit can generate 256 gamma voltages, namely each gray scale corresponds to a gamma voltage. After the display device is powered on, the source driving circuit receives a digital video data signal and a control signal output by the timing sequence controller, and converts the digital video data signal and the control signal to corresponding gray scale voltage of each pixel in the display panel to drive the display panel to run, referring to the gamma voltage corresponding to the current gray scale of the display panel.

It should be noted that the gamma voltage has a mapping relationship with brightness of the display panel at each gray scale, which can be reflected by a voltage-brightness V-T curve. In other words, in the current gray scale, to adjust the gamma voltage can adjust the brightness of the display panel.

Under the control of the timing sequence controller, the switching controlling circuit 10 generates the first control signal and the second control signal according to the timing sequence control signal output by the timing sequence controller. The first control signal and the second control signal may be square wave signals with opposite polarity. For example, when the first control signal is at high level, the second control signal is at low level, or when the first control signal is at low level, the second control signal is at high level. A switching control signal may be a continuous square wave signal or a multipulse signal. A duty ratio of the first control signal and a duty ratio of the second control signal can be defined according to factors such as row scanning time, brightness compensation and degree of color deviation among three sub pixels of red, green and blue. The duty ratio of the first control signal and the duty ratio of the second control signal can also be defined according to a clock control signal of a row scanning line. For example, the first control signal is output during the clock control signal of the odd row, and the second control signal is output during the clock control signal of the even row.

The gamma voltage output circuit 20 switches on when receiving the first control signal, thereby to output the first gamma voltage input from the gamma voltage input port Gma-in to the gamma voltage output port Gma-out, namely to output the first gamma voltage generated by the gamma voltage generation circuit to the source driving circuit. The gamma voltage output circuit 20 switches off, namely does not operate when receiving the second control signal.

The gamma voltage processing circuit 30 does not operate when receiving the first control signal, and converts the first gamma voltage input from the gamma voltage input port Gma-in to a second gamma voltage after voltage dividing disposition when receiving the second control signal, and then outputs the second gamma voltage to the gamma voltage output port Gma-out.

It can be understood that the first gamma voltage GmA is proportional to the second gamma voltage GmB, namely GmB=X*GmA; wherein X is a proportionality coefficient, and X is a positive number less than one.

Because three sub pixels of red R, green G and blue B arrange in column in three gate pixel driving framework of the display panel and the charging time is shortened, the charging rate of one of the sub pixels may be higher or lower than that of the other two sub pixels, even charging rates of the three sub pixels are not equal each other. For example, when the three sub pixels are arranged in red R, green G and blue B from top to bottom, the charging time of the sub pixels of red R and green G may be longer than that of the sub pixel of blue B, making the charging rate of the sub pixel of blue B be lower than that of sub pixels of red R and green G. Therefore, adjustment can be done according to the color deviation of the three sub pixels of red R, green G and blue B and the color deviation pixel in the process of practical application. For example, if the charging rates of the sub pixels of red R and green G are higher than that of the sub pixel of blue B, the switching controlling circuit 10 controls the gamma voltage output circuit 20 to output the first gamma voltage to the gamma voltage output port Gma-out when the sub pixel of blue B is being charged, so as to make the source driving circuit to convert the first gamma voltage to corresponding gray scale voltage of the B sub pixel in the display panel. When the red R sub pixel and the green G sub pixel are being charged, the switching controlling circuit 10 controls the gamma voltage processing circuit 30 to convert the first gamma voltage to the second gamma voltage, and then to make the source driving circuit to convert the second gamma voltage to corresponding gray scale voltages of the red R sub pixel and the green G sub pixel in the display panel. In this way, a data voltage output to corresponding sub pixel can be adjusted through adjusting the gamma voltage, ensuring the homogeneous of charging rates of three sub pixels of red R, green G and blue B. Of course, in other embodiments, the switching controlling circuit 10 may also adjust the output of the first gamma voltage and the second gamma voltage according to the charging saturation of each sub pixel of R, green G and blue B in the display panel, or adjust the output of the second gamma voltage according to the degree of color deviation.

Each pixel in the display panel consists of three sub pixels of red R, green G and blue B. In the three gate pixel driving framework, the number of row scanning lines is tripled and the number of data lines is one third of the original one. Since the increase of row scanning lines does not require an additional driving circuit cost, and the decrease of the number of data lines can reduce the number of source driving circuits, the three gate pixel driving framework is applied in the display panel more and more.

However, a scanning time of one frame in the display panel is fixed. For example, a scanning frequency is fixed at 60 Hz in a display panel with the 1366×768 resolution. The scanning time of each sub pixel is reduced to one third of the original one with the increase of the row scanning lines, which reduces the data writing time, namely the charging time of the sub pixel to one third of the original one and then leads to the homogeneity of charging rate of each sub pixel cannot be ensured. The higher the charging voltage of sub pixel is, the brighter the brightness of the display panel, in the opposite, the darker the brightness of the display panel, which makes it prone to appear the image quality problems such as color deviation in the display panel.

In the present application, the gamma voltage regulation circuit generates a first control signal/a second control signal according to a timing sequence control signal received through setting a switching controlling circuit 10; so as to make a gamma voltage output circuit 20 switch on when receiving the first switching signal, to output a first gamma voltage input from the gamma voltage input port Gma-in to the gamma voltage output port Gma-out; or to set a gamma voltage processing circuit 30 to convert the first gamma voltage input from the gamma voltage input port Gma-in to a second gamma voltage when receiving the second control signal and then to output the second gamma voltage to the gamma voltage output port Gma-out. The present application adjusts a data voltage output to a corresponding sub pixel through adjusting a gamma voltage output to a source driving circuit in one same gray scale, to ensure homogeneity of charging rate in each sub pixel in a display panel, so as to solve the color deviation problem in the display panel caused by the inhomogeneity of charging rate in each sub pixel. The present application helps improve image quality of the display panel.

Referring to FIG. 1 and FIG. 2, in an optional embodiment, the switching controlling circuit 10 includes a trigger 11, a first switching tube Q1 and a second switching tube Q2, a clock signal input port of the trigger 11 is configured to receive the timing sequence control signal, a signal output port of the trigger 11 connects to a controlled port of the first switching tube Q1 and a controlled port of the second switching tube Q2, an input port of the first switching tube Q1 connects to a first direct current power supply, an output port of the first switching tube Q1 is configured to output the first control signal, an output port of the second switching tube Q2 is configured to output the second control signal, an input port of the second switching tube Q2 is grounded, the output port of the first switching tube Q1 and the output port of the second switching tube Q2 further connect to the signal input port of the trigger 11.

In the above embodiments, the switching controlling circuit 10 further includes a pull down resistor R1, a first port of the pull down resistor R1 connects to a common port of the first switching tube Q1 and the second switching tube Q2, a second port of the pull down resistor R1 is grounded.

In the present embodiment, the first switching tube Q1 and the second switching tube Q2 can be switching tubes such as triodes, field effect transistors, IGBTs and so on. In the present embodiment, the first switching tube Q1 can be a p type field effect transistor optionally, and the second switching tube Q2 can be a n type field effect transistor optionally. The signal input port of the trigger 11 connects to a source electrode of the n type field effect transistor and a drain electrode of the p type field effect transistor, the output port of the trigger 11 connects to a gate electrode of the n type field effect transistor and a gate electrode of the p type field effect transistor. The pull down resistor R1 outputs a signal at low level to the source electrode of the n type field effect transistor and the drain electrode of the p type field effect transistor, the trigger 11 does not operate when the timing sequence control signal is not received, the pull down resistor R1 outputs the first control signal at low level to the gamma voltage output circuit 20 at this time, so that the gamma voltage output circuit 20 switches on, and the first gamma voltage is output to the gamma voltage output port Gma-out.

The signal input port of the trigger 11 assigns the trigger signal at low level output by the pull down resistor R1 to the signal output port when receiving a rising edge timing sequence control signal output by the timing sequence controller, thus making the trigger 11 output the control signal at low level. At this time, the n type field effect transistor is cut off, the p type field effect transistor switches on and outputs the second control signal at high level to the gamma voltage processing circuit 30, so as to convert the first gamma voltage accessed into the second gamma voltage and then to output the second gamma voltage.

The signal input port of the trigger 11 assigns the trigger signal at high level output by the p type field effect transistor to the signal output port when receiving the rising edge timing sequence control signal output by the timing sequence controller again, so as to make the trigger 11 to output the control signal at high level. At this time, the p type field effect transistor is cut off, the n type field effect transistor switches on and outputs the first control signal at low level to the gamma voltage output circuit 20, in order to turn on the gamma voltage output circuit 20, and to output the first gamma voltage to the gamma voltage output port Gma-out, to accomplish the conversion between the first gamma voltage and the second gamma voltage.

Referring to FIG. 1 and FIG. 2, in an optional embodiment, the gamma voltage output circuit 20 includes a third switching tube Q3, an input port of the third switching tube Q3 connects to the gamma voltage input port Gma-in, an output port of the third switching tube Q3 connects to the gamma voltage output port Gma-out, a controlled port of the third switching tube Q3 connects to an output port of the first switching tube Q1 and an output port of the second switching tube Q2.

In the present embodiment, the third switching tube Q3 can be a switching tube such as a triode, a field effect transistor, an IGBT and so on. In the present embodiment, the third switching tube Q1 can be a p type field effect transistor optionally. The p type field effect transistor switches on when the first control signal at low level is received, and outputs the first gamma voltage. The p type field effect transistor is cut off when the second control signal at high level is received.

Referring to FIG. 1 and FIG. 2, in an optional embodiment, the gamma voltage processing circuit 30 includes a forth switching tube Q4, a second resistor R2 and a third resistor R3, a controlled port of the forth switching tube Q4 connects to the output port of the first switching tube Q1 and the output port of the second switching tube Q2, an input port of the forth switching tube Q4 connects to the gamma voltage input port Gma-in, an output port of the forth switching tube Q4 connects to a first port of the second resistor R2, of the second resistor R2 is grounded through the third resistor R3, a common port of the second resistor R2 and the third resistor R3 further connects to the gamma voltage output port Gma-out.

In the present embodiment, the forth switching tube Q4 can be a switching tube such as a triode, a field effect transistor, an insulated gate bipolar transistor and so on. In the present embodiment, the forth switching tube Q4 can be an n type field effect transistor optionally.

The second resistor R2 and the third resistor R3 constitute a series voltage dividing circuit. And when the forth switching tube Q4 switches on, the first gamma voltage is divided, converted to the second gamma voltage, and then the second gamma voltage is output. Specifically, when the second control signal at high level is received, the n type field effect transistor switches on, and outputs the first gamma voltage to the second resistor R2 and the third resistor R3, to make the second resistor R2 and the third resistor R3 to divide the first gamma voltage, and then to output to the gamma voltage output port Gma-out. When the first control signal at low level is received, the n type field effect transistor is cut off, the second resistor R2 and the third resistor R3 do not operate at this time. It can be understood that, according to the series voltage division principle, the greater the ratio of the second resistor R2 to the third resistor R3, the greater the voltage divided by the third resistor R3. In this way, the voltage value of the second gamma voltage can be adjusted by adjusting the resistance value of the second resistor R2 and/or the third resistor R3, which can be defined according to the sub pixel of the display panel or the color deviation of the entire panel specifically.

Referring to FIG. 1 and FIG. 2, in an optional embodiment, the gamma voltage processing circuit 30 further includes a fifth switching tube Q5, the fifth switching tube Q5 connects in series to the common port of the second resistor R2 and the third resistor R3, and the gamma voltage output port Gma-out.

In the present embodiment, the fifth switching tube Q5 can be a switching tube such as a triode, a field effect transistor, an IGBT and so on. In the present embodiment, the fifth switching tube Q5 can be an n type field effect transistor optionally.

In the embodiment, in order to avoid voltage of the gamma voltage output port Gma-out being output to the common port of the second resistor R2 and the third resistor R3 and being divided, and thus the first gamma voltage output by the gamma voltage output port Gma-out is affected, by setting the switching tube Q5, and making the switching tube Q5 to switch on when the second control signal output by the switching controlling circuit 10 is received, to output the second gamma voltage converted from the first gamma voltage divided by the second resistor R2 and the third resistor R3 in series to the gamma voltage output port Gam-out through the fifth switching tube Q5. The fifth switching tube Q5 is kept off when the first control signal output by the switching controlling circuit 10 is received.

The present application further provides a gamma voltage regulation circuit.

Figure 3:
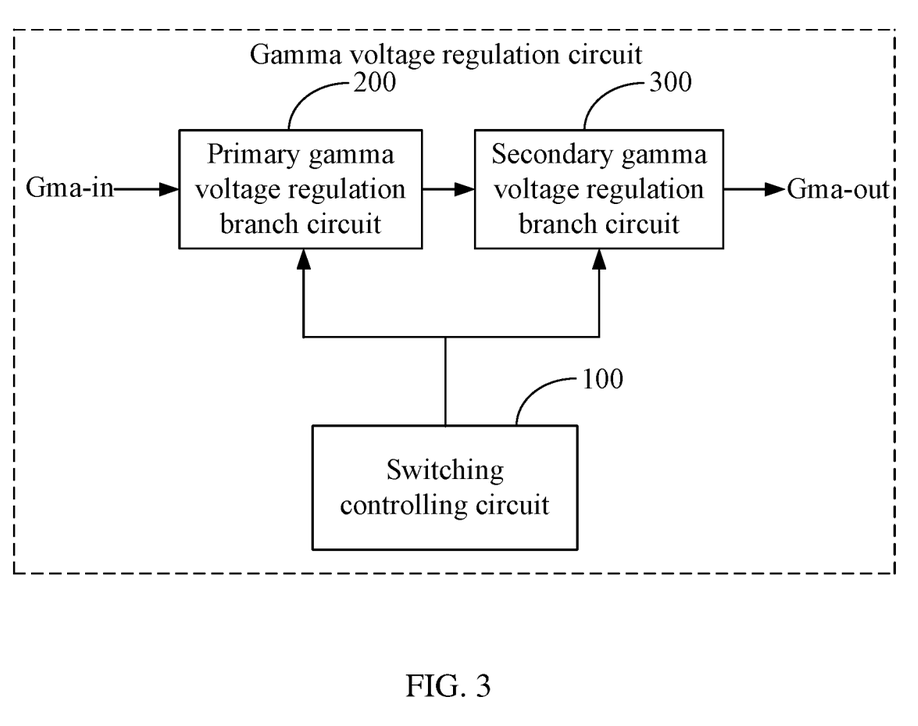
FIG. 3 is a functional module schematic diagram of a gamma voltage regulation circuit in another embodiment of the present application.
Figure 4:
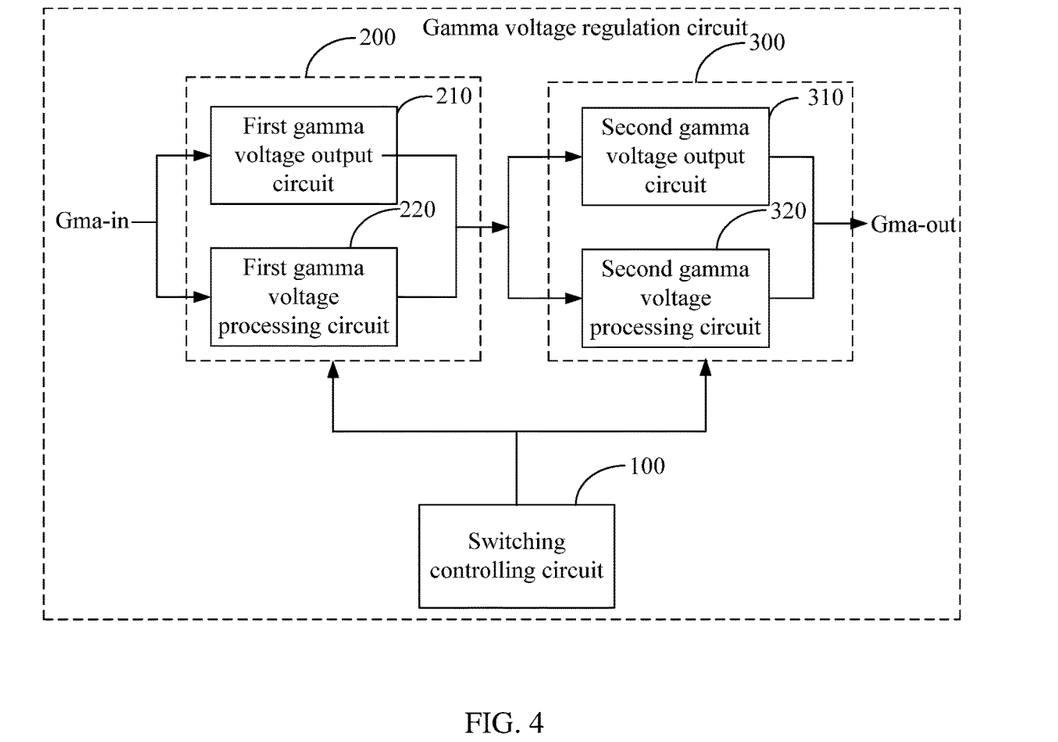
FIG. 4 is a circuit structure schematic diagram of a gamma voltage regulation circuit in another embodiment of the present application.

Referring to FIG. 3 and FIG. 4, in an embodiment of the present application, the gamma voltage regulation circuit includes:

a gamma voltage input port Gma-in and a gamma voltage output port Gma-out;

a switching controlling circuit 100, a controlled port of the switching controlling circuit connects to the timing sequence controller, the switching controlling circuit 100 is configured to generate a corresponding control signal according to the timing sequence control signal received, the control signal comprises a first control good, a second control signal, a third control signal, and a forth control signal;

a primary gamma voltage regulation branch circuit 200, configured to output a first gamma voltage input from the gamma voltage input port Gma-in when receiving the first control signal, or to convert the first gamma voltage input from the gamma voltage input port Gma-in to a second gamma voltage when receiving the second control signal and to output the second gamma voltage;

a secondary gamma voltage regulation branch circuit 300, configured to output the second gamma voltage when receiving the third control signal, or to convert the second gamma voltage input from the gamma voltage input port Gma-in to a third gamma voltage when receiving the forth control signal and to output the third gamma voltage.

In the present embodiment, the gamma voltage regulation circuit adjusts the first gamma voltage twice through the primary gamma voltage regulation branch circuit 200 and the secondary gamma voltage regulation branch circuit 300, so as to convert the first gamma voltage to the second gamma voltage and the third gamma voltage, and to output the first gamma voltage, the second gamma voltage and the third gamma voltage according to the timing sequence control signal. Corresponding gamma voltage is output separately according to the brightness difference among three sub pixels of red R, green G and blue B when the charging rates of three sub pixels of red R, green G and blue B are unequal with each other, to adjust the data voltage output to each corresponding sub pixel, to ensure the homogeneity of the charging rate of each sub pixel in the display panel and to solve the color deviation problem in the display panel caused by the inhomogeneity of the charging rate of each sub pixel. The present application helps improve the image quality of the display panel.

Referring to FIG. 3 and FIG. 4, the primary gamma voltage regulation branch circuit 200 further includes:

a first gamma voltage output circuit 210, configured to switch on when receiving the first control signal and to output the first gamma voltage input from the gamma voltage input port Gma-in to the gamma voltage output port Gma-out;

a first gamma voltage processing circuit 220, configured to convert the first gamma voltage input from the gamma voltage input port Gma-in to the second gamma voltage when receiving the second control signal and then to output the second gamma voltage.

In the present embodiment, under the control of the timing sequence controller, the switching controlling circuit 100 generates the first control signal and the second control signal according to the timing sequence control signal output by the timing sequence controller. The first control signal and the second control signal may be square wave signals with opposite polarity. For example, when the first control signal is at high level, the second control signal is at low level, or when the first control signal is at low level, the second control signal is at high level. A switching control signal may be a continuous square wave signal or a multi-pulse signal. A duty ratio of the first control signal and a duty ratio of the second control signal can be defined according to factors such as row scanning time, brightness compensation and degree of color deviation among three sub pixels of red, green and blue. The duty ratio of the first control signal and the duty ratio of the second control signal can also be defined according to a clock control signal of a row scanning line. For example, the first control signal is output during the clock control signal of the odd row, and the second control signal is output during the clock control signal of the even row. Such configuration enables the first gamma voltage input from the gamma voltage input port Gma-in to be output when the first gamma voltage output circuit 210 receives the first control signal, or to convert the first gamma voltage input from the gamma voltage input port Gma-in to the second gamma voltage and then to output the second gamma voltage when the first gamma voltage processing 220 receives the second control signal.

Referring to FIG. 3 and FIG. 4, the secondary gamma voltage regulation branch circuit 300 further includes:

a second gamma voltage output circuit 310, configured to switch on when receiving the third control signal and to output the second gamma voltage to the gamma voltage output port Gma-out;

a second gamma voltage processing circuit 320, configured to convert the second gamma voltage to the third gamma voltage when receiving the forth control signal and to output the third gamma voltage to the gamma voltage output port Gma-out.

In the present embodiment, under the control of the timing sequence controller, the switching controlling circuit 100 generates the third control signal and the forth control signal according to the timing sequence control signal output by the timing sequence controller. The third control signal and the forth control signal may be square wave signals with opposite polarity. For example, when the third control signal is at high level, the forth control signal is at low level, or when the third control signal is at low level, the forth control signal is at high level. A switching control signal may be a continuous square wave signal or a multipulse signal. A duty ratio of the third control signal and a duty ratio of the forth control signal can be defined according to factors such as row scanning time, brightness compensation and degree of color deviation among three sub pixels of red, green and blue. The duty ratio of the third control signal and the duty ratio of the forth control signal can also be defined according to a clock control signal of a row scanning line. For example, the third control signal is output during the clock control signal of the odd row, and the forth control signal is output during the clock control signal of the even row. Such configuration enables the first gamma voltage input from the gamma voltage input port Gma-in to be output when the second gamma voltage output circuit 310 receives the third control signal, or to convert the first gamma voltage input from the gamma voltage input port Gma-in to the second gamma voltage and then to output the second gamma voltage when the second gamma voltage processing 320 receives the forth control signal.

In the present embodiment, the circuit structures and parameters of each component in the primary gamma voltage regulation branch circuit 200 and the secondary gamma voltage regulation branch circuit 300 can be set to be same or different, according to the color deviation in the display panel specifically and no restriction is made here. In the present embodiment, the operation principle and circuit settlement of the primary gamma voltage regulation branch circuit 200 and the secondary gamma voltage regulation branch circuit 300 can refer to the above embodiments of the gamma voltage regulation circuit, no need to repeat again here.

Figure 5:
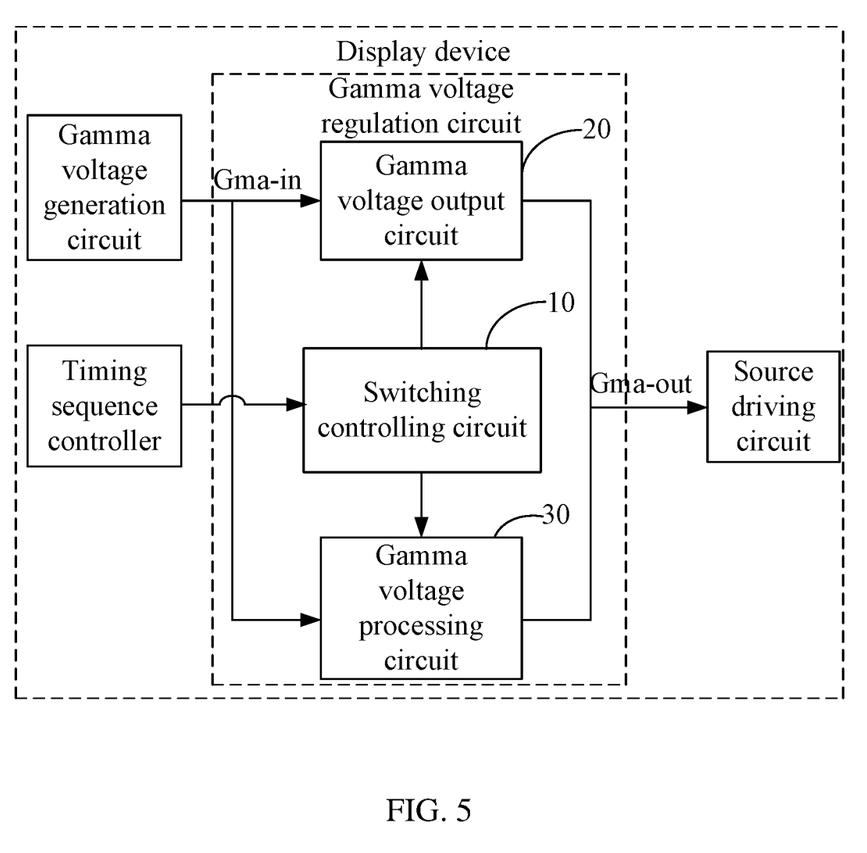
FIG. 5 is a circuit structure schematic diagram of a display device in an embodiment of the present application.

The present application further provides a display device, as shown in FIG. 5, includes a gamma voltage generation circuit, a timing sequence controller, a source driving circuit and a gamma voltage regulation circuit described as above. The detailed structure of the gamma voltage regulation circuit may refer to the above embodiments, no need to repeat again here. It can be understood that as the display device adopts all the technical proposals of the above exemplary embodiments, the display device at least has all of the beneficial effects of the technical proposals of the above exemplary embodiments, no need to repeat again.

In the present embodiment, the display device may be a display device such as a television, a computer, a projector, a mobile phone and so on.

The above is only a preferred embodiment of the present application, and thus does not limit the scope of the patent application, and the equivalent structure or equivalent process transformation of the specification and the drawings of the present application, or directly or indirectly applied to other related technical fields. The same is included in the scope of patent protection of this application.

What is claimed is:

1. A gamma voltage regulation circuit, which is applied to a display device, the display device comprising a timing sequence controller for outputting a timing sequence control signal, wherein the gamma voltage regulation circuit comprises:

a gamma voltage input port and a gamma voltage output port;

a switching controlling circuit, configured to generate a first control signal or a second control signal according to the timing sequence control signal received;

a gamma voltage output circuit, configured to switch on when receiving the first control signal, to output a first gamma voltage input from the gamma voltage input port to the gamma voltage output port; and a gamma voltage processing circuit, configured to convert the first gamma voltage input from the gamma voltage input port to a second gamma voltage when receiving the second control signal, and then to output the second gamma voltage to the gamma voltage output port, wherein the gamma voltage output circuit comprises a third switching tube, an input port of the third switching tube connects to the gamma voltage input port, an output port of the third switching tube connects to the gamma voltage output port, a controlled port of the third switching tube connects to an output port of the first switching tube and an output port of the second switching tube.

2. The gamma voltage regulation circuit according to claim 1, wherein the switching controlling circuit comprises a trigger, a first switching tube, and a second switching tube, a clock signal input port of the trigger is configured to receive the timing sequence control signal, a signal output port of the trigger connects to a controlled port of the first switching tube and a controlled port of the second switching tube, an input port of the first switching tube connects to a first direct current power supply, an output port of the first switching tube is configured to output the first control signal, an output port of the second switching tube is configured to output the second control signal, an input port of the second switching tube is grounded, the output port of the first switching tube and the output port of the second switching tube further connect to a signal input port of the trigger.

3. The gamma voltage regulation circuit according to claim 2, wherein the switching controlling circuit further comprises a pull down resistor, a first port of the pull down resistor connects to a common port of the first switching tube and the second switching tube, a second port of the pull down resistor is grounded.

4. The gamma voltage regulation circuit according to claim 2, wherein the gamma voltage processing circuit comprises a forth switching tube, a second resistor, and a third resistor, a controlled port of the forth switching tube connects to the output port of the first switching tube and the output port of the second switching tube, an input port of the forth switching tube connects to the gamma voltage input port, an output port of the forth switching tube connects to a first port of the second resistor, a second port of the second resistor is grounded through the third resistor, a common port of the second resistor and the third resistor further connects to the gamma voltage output port.

5. The gamma voltage regulation circuit according to claim 4, wherein the gamma voltage processing circuit further comprises a fifth switching tube, the fifth switching tube connects in series to the common port of the second resistor and the third resistor, and the gamma voltage output port.

6. The gamma voltage regulation circuit according to claim 1, wherein the first control signal and the second control signal are square wave signals with opposite polarity.

7. The gamma voltage regulation circuit according to claim 1, wherein a duty ratio of the first control signal and a duty ratio of the second control signal are defined according to a clock control signal of a row scanning line.

8. The gamma voltage regulation circuit according to claim 1, wherein the first gamma voltage GmA is proportional to the second gamma voltage GmB, namely GmB=X*GmA; wherein X is a proportionality coefficient, and X is a positive number less than one.

9. A gamma voltage regulation circuit, which is applied to a display device, the display device comprising a timing sequence controller for outputting a timing sequence control signal, wherein the gamma voltage regulation circuit comprises:
 a gamma voltage input port and a gamma voltage output port;
 a switching controlling circuit, which connects to the timing sequence controller, the switching controlling circuit is configured to generate a corresponding control signal according to the timing sequence control signal received, the control signal comprises a first control signal, a second control signal, a third control signal, and a forth control signal;
 a primary gamma voltage regulation branch circuit, configured to output a first gamma voltage input from the gamma voltage input port when receiving the first control signal, or to convert the first gamma voltage input from the gamma voltage input port to a second gamma voltage when receiving the second control signal and then to output the second gamma voltage;
 a secondary gamma voltage regulation branch circuit, configured to output the second gamma voltage when receiving the third control signal, or to convert the second gamma voltage input from the gamma voltage input port to a third gamma voltage when receiving the forth control signal and then to output the third gamma voltage.

10. The gamma voltage regulation circuit according to claim 9, wherein the primary gamma voltage regulation branch circuit comprises:
 a first gamma voltage output circuit, configured to switch on when receiving the first control signal and to output the first gamma voltage input from the gamma voltage input port to the gamma voltage output port;
 a first gamma voltage processing circuit, configured to convert the first gamma voltage input from the gamma voltage input port to the second gamma voltage when receiving the second control signal and then to output the second gamma voltage.

11. The gamma voltage regulation circuit according to claim 9, wherein the first control signal and the second control signal are square wave signals with opposite polarity.

12. The gamma voltage regulation circuit according to claim 9, wherein the secondary gamma voltage regulation branch circuit comprises:
 a second gamma voltage output circuit, configured to switch on when receiving the third control signal and to output the second gamma voltage to the gamma voltage output port;
 a second gamma voltage processing circuit, configured to convert the second gamma voltage to the third gamma voltage when receiving the forth control signal and then to output the third gamma voltage to the gamma voltage output port.

13. The gamma voltage regulation circuit according to claim 9, wherein the third control signal and the forth control signal are square wave signals with opposite polarity.

14. A display device, wherein the display device comprises a gamma voltage generation circuit, a source driving circuit, a timing sequence controller, and a gamma voltage regulation circuit, the gamma voltage regulation circuit is connected in series between the gamma voltage generation circuit and the source driving circuit, a controlled port of the gamma voltage regulation circuit connects to a controlling port of the timing sequence controller;
 the gamma voltage regulation circuit comprises:
 a gamma voltage input port and a gamma voltage output port;
 a switching controlling circuit, configured to generate a first control signal or a second control signal according to the timing sequence control signal received;
 a gamma voltage output circuit, configured to switch on when receiving the first control signal, to output a first gamma voltage input from the gamma voltage input port to the gamma voltage output port; and
 a gamma voltage processing circuit, configured to convert the first gamma voltage input from the gamma voltage input port to a second gamma voltage when receiving the second control signal, and then to output the second gamma voltage to the gamma voltage output port, wherein the gamma voltage output circuit comprises a third switching tube, an input port of the third switching tube connects to the gamma voltage input port, an output port of the third switching tube connects to the gamma voltage output port, a controlled port of the third switching tube connects to an output port of the first switching tube and an output port of the second switching tube.

15. The display device according to claim 14, wherein the display device further comprises a display panel, the display panel connects to the source driving circuit.

16. The display device according to claim 15, wherein the display panel integrates a thin film transistor array, and in the thin film transistor array, each column of thin film transistors connect to the source driving circuit through a data line.

17. The display device according to claim 16, wherein the display device further comprises a gate driving circuit, and in the thin film transistor array, each row of thin film transistors connect to the gate driving circuit through a scanning line.

18. The display device according to claim 14, wherein a pixel driving framework in the display panel is three gate pixel driving framework.

\* \* \* \* \*